(12) United States Patent
Park

(10) Patent No.: US 7,434,559 B2
(45) Date of Patent: Oct. 14, 2008

(54) RETAINER FOR SUPPORTING VALVE SHAFT IN VARIABLE INTAKE SYSTEM

(75) Inventor: Dae-Sung Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 174 days.

(21) Appl. No.: 11/281,101

(22) Filed: Nov. 16, 2005

(65) Prior Publication Data

US 2007/0079802 A1  Apr. 12, 2007

(30) Foreign Application Priority Data

Oct. 7, 2005  (KR) ...................... 10-2005-0094271

(51) Int. Cl.
*F02D 9/10* (2006.01)
*F02M 35/10* (2006.01)

(52) U.S. Cl. ........................... 123/184.53; 123/184.55; 123/336

(58) Field of Classification Search ............ 123/184.21, 123/184.61, 184.53, 336, 337; 248/309.1, 248/200, 674
See application file for complete search history.

(56) References Cited

U.S. PATENT DOCUMENTS 5,687,684 A * 11/1997 Verkleeren ............. 123/184.55
6,135,418 A * 10/2000 Hatton ...................... 251/306
6,378,480 B2 * 4/2002 Narayanaswamy et al. ..................... 123/184.21

FOREIGN PATENT DOCUMENTS

| EP | 1 363 030 A2 | 11/2003 |
| JP | 01-148618 | 6/1989 |
| JP | 03-213708 | 9/1991 |
| JP | 06-264914 | 9/1994 |
| JP | 101153206 | 6/1998 |
| JP | 2000-100420 | 4/2000 |

* cited by examiner

*Primary Examiner*—Stephen K. Cronin
*Assistant Examiner*—Hyder Ali
(74) *Attorney, Agent, or Firm*—Peter F. Corless; Edwards Angell Palmer & Dodge LLP

(57) ABSTRACT

A retainer device is provided suitable for supporting a valve shaft in a variable intake system. Preferred retainer devices can stably support a valve shaft of a variable intake system and may suitably include a shaft support part that can engage a valve shaft of the variable intake system; a fork part that can engage a valve shaft locking bolt; and a stop part spaced from the fork part by a distance sufficient to position the locking bolt between the fork part and the stop part. In preferred systems, even if a valve shaft locking bolt fastening the valve shaft is undesirably loosened during engine operation, the locking bolt is prevented from being completely removed from the retainer, thereby avoiding potential engine damage.

13 Claims, 4 Drawing Sheets

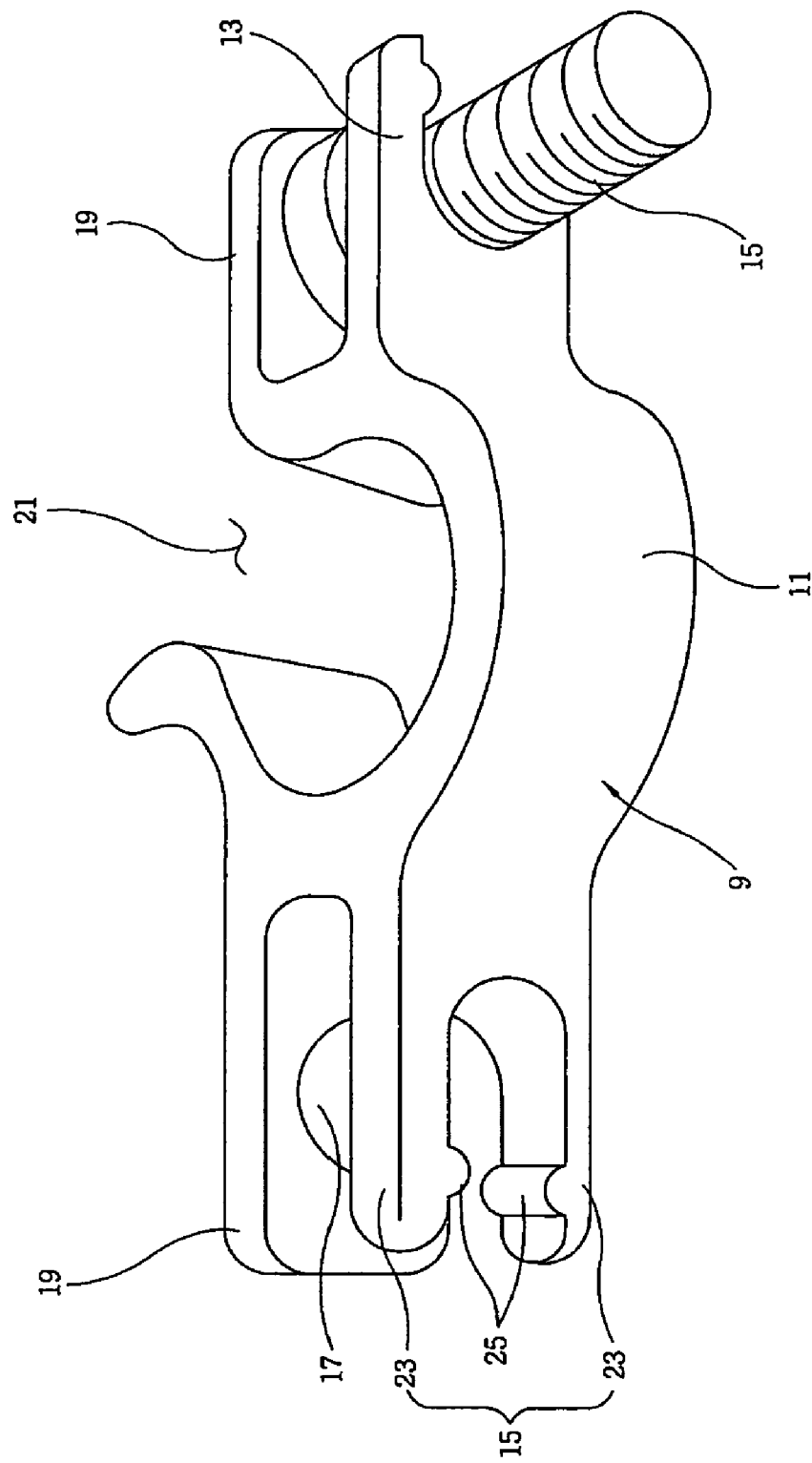

RETAINER FOR SUPPORTING VALVE SHAFT IN VARIABLE INTAKE SYSTEM

CROSS-REFERENCE TO RELATED APPLICATIONS

The present application is based on, and claims priority from, Korean Application Serial Number 10-2005-0094271, filed on Oct. 7, 2005, the disclosure of which is hereby incorporated by reference herein in its entirety.

FIELD OF THE INVENTION

The present invention relates to retainers for supporting valve shafts in variable intake systems and, more particularly, to a retainer which is installed in an intake manifold assembly and is used for supporting a valve that changes the length of a runner.

BACKGROUND OF THE INVENTION

As well known to those skilled in the art, a variable intake system adjusts the length of a runner of an intake manifold, through which air to be drawn into a combustion chamber passes, depending on the engine operating conditions, thus enhancing the performance of the engine.

To adjust the length of the runner through which intake air passes, a plurality of valves is rotatably provided on a valve shaft in the intake manifold assembly. A plurality of retainers and a plurality of locking bolts are used for installation of the valve shaft.

The retainers and locking bolts to be used for retaining the valve shaft must stably support the valve, and the stable installation state must be maintained.

The information set forth in this Background of the Invention section is only for enhancement of understanding of the invention and should not be taken as an acknowledgement or any form of suggestion that this information forms the prior art that is already known to a person skilled in the art.

SUMMARY OF THE INVENTION

In one aspect, a retainer device is provided which preferably can stably support a valve shaft of a variable intake system, and in which, even if a locking bolt fastening the valve shaft is undesirably loosened during the operation of an engine, the locking bolt is prevented from being completely removed from the retainer which supports the valve shaft, thereby avoiding potential engine damage.

A retainer for supporting a valve shaft of a variable intake system according to a preferred embodiment of the present invention includes a shaft support part suitably provided at a medial portion of a retainer body to receive and support the valve shaft of the variable intake system. A fork part is provided suitably on each end of the medial portion of the retainer body, so that a shank part of a locking bolt is inserted into the fork part. A stop part is suitably provided on each end of the medial portion of the retainer body and spaced apart from each fork part by a predetermined distance sufficient to place a head part of the locking bolt between the fork part and the stop part, with a tool passing hole formed in each stop part so that a tool for tightening the locking bolt is allowed to pass through the tool passing hole of the stop part.

Vehicular variable intake systems also are provided that comprise a retainer device as disclosed herein.

It is understood that the term "vehicle" or "vehicular" or other similar terms as used herein is inclusive of motor vehicles in general such as passenger automobiles, buses, trucks, various commercial vehicles, watercraft including a variety of boats, aircraft, and the like.

Other aspects of the invention are discussed below.

BRIEF DESCRIPTION OF THE DRAWINGS

For a better understanding of the nature and objects of the present invention, reference should be made to the following detailed description with the accompanying drawings, in which:

FIGS. 3 and 4 are detailed perspective views showing the retainer according to the present invention.

DETAILED DESCRIPTION OF PREFERRED EMBODIMENTS

As discussed above, in one aspect, a retainer is advantageously employed with a variable intake system of a motor vehicle or other vehicle, including to support a valve shaft of the variable intake system.

Preferred retainer devices suitably include a shaft support part that can engage a valve shaft of a variable intake system, e.g. to receive and support the valve shaft. Preferably, the shaft support part is provided at a middle or medial portion or area of the retainer body.

In preferred retain devices, the shaft support part is provided with a shaft insertion mouth oriented such that a valve shaft can be inserted into the shaft support part in a direction opposite to screw motion of the valve shaft locking bolt when being tightened. Preferably, a valve shaft can be press fit into the shaft insertion mouth. For instance, in one preferred design, the shaft insertion mouth is smaller than a diameter of the valve shaft whereby the valve shaft can be fitted or securely nested into the shaft support part using elastic strain of the shaft support part.

Preferred retainer devices also may suitably include a fork part. Suitably, a valve shaft locking bolt can engage the fork part, e.g. wherein a shank part of a locking bolt can engage such insert into the fork part. Preferred fork parts also include those that are provided on each end of the medial portion of the retainer body.

Preferred fork parts also may include one or more support arms extending outwards from the shaft support part. In preferred systems, two support arms are employed. Preferably, one or more stop protrusions protrude from the support arms to inhibit withdrawal of the locking bolt inserted between the support arms.

Preferred retainer devices also may suitably include a stop part. Suitable stop parts include those that may be spaced from each fork part by distance sufficient to place a head part of the valve shaft locking bolt between the fork part and the stop part. Preferred stop parts also may include a tool-passing hole or aperture whereby a tool for manipulating (e.g., tightening) the locking bolt can pass through the stop part aperture. In preferred designs, a stop part may be positioned on each end of the medial portion of the retainer body.

Preferred embodiments of the present invention are now described with reference to the attached drawings.

Figure 1:
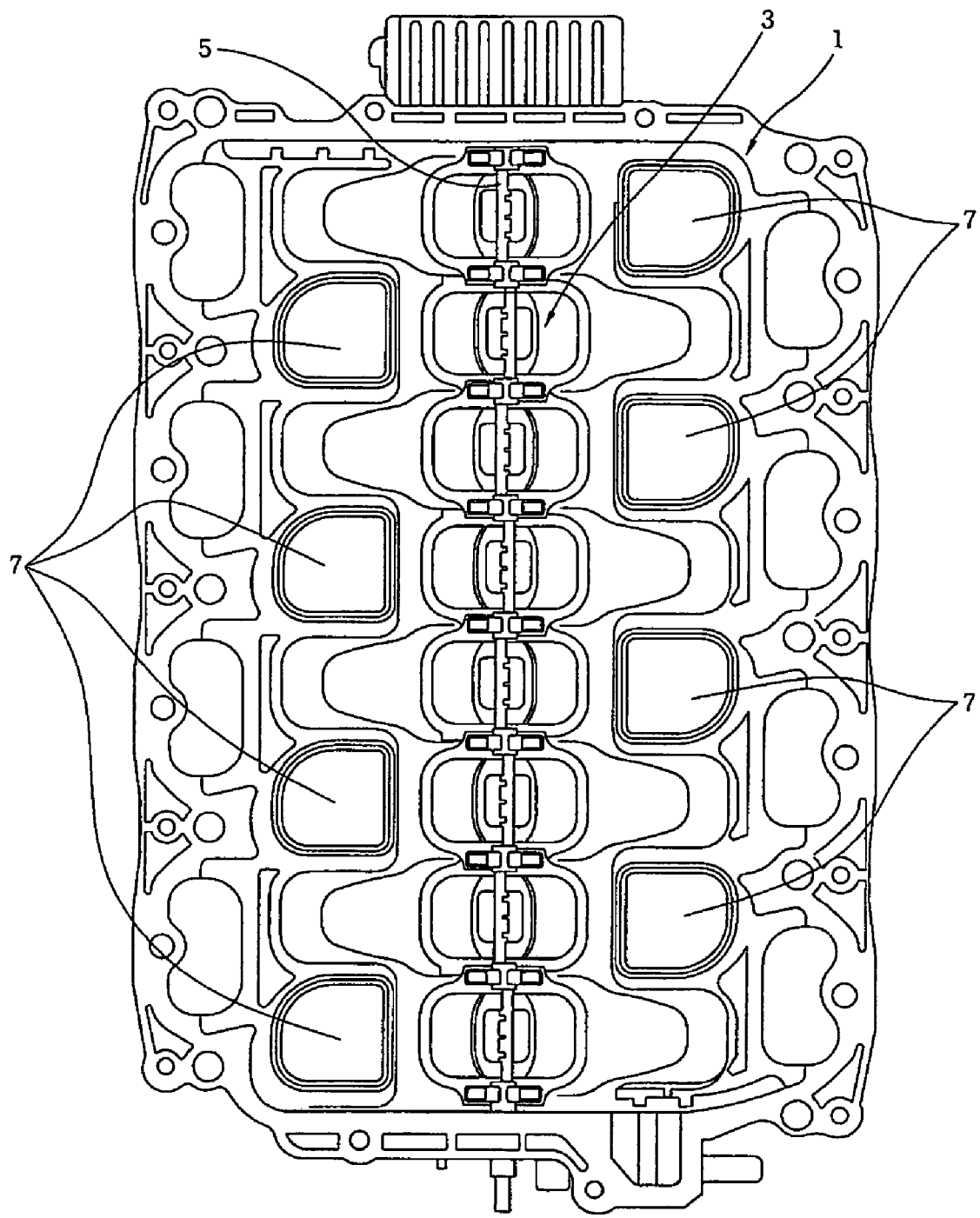
FIG. 1 is a bottom view showing the inner construction of an intake manifold assembly, in which a valve shaft of a valve is supported by a retainer according to an embodiment of the present invention.

FIG. 1 is a bottom view showing the inner construction of a variable intake system to which the present invention is suitably applied. As shown in FIG. 1, a plurality of valves 3 each having a flap is rotatably provided on a valve shaft 5, which is suitably supported along a longitudinal central line in an intake manifold assembly 1. A plurality of runners 7, which communicate with combustion chambers, is disposed on opposite sides of the valves 3.

Figure 2:
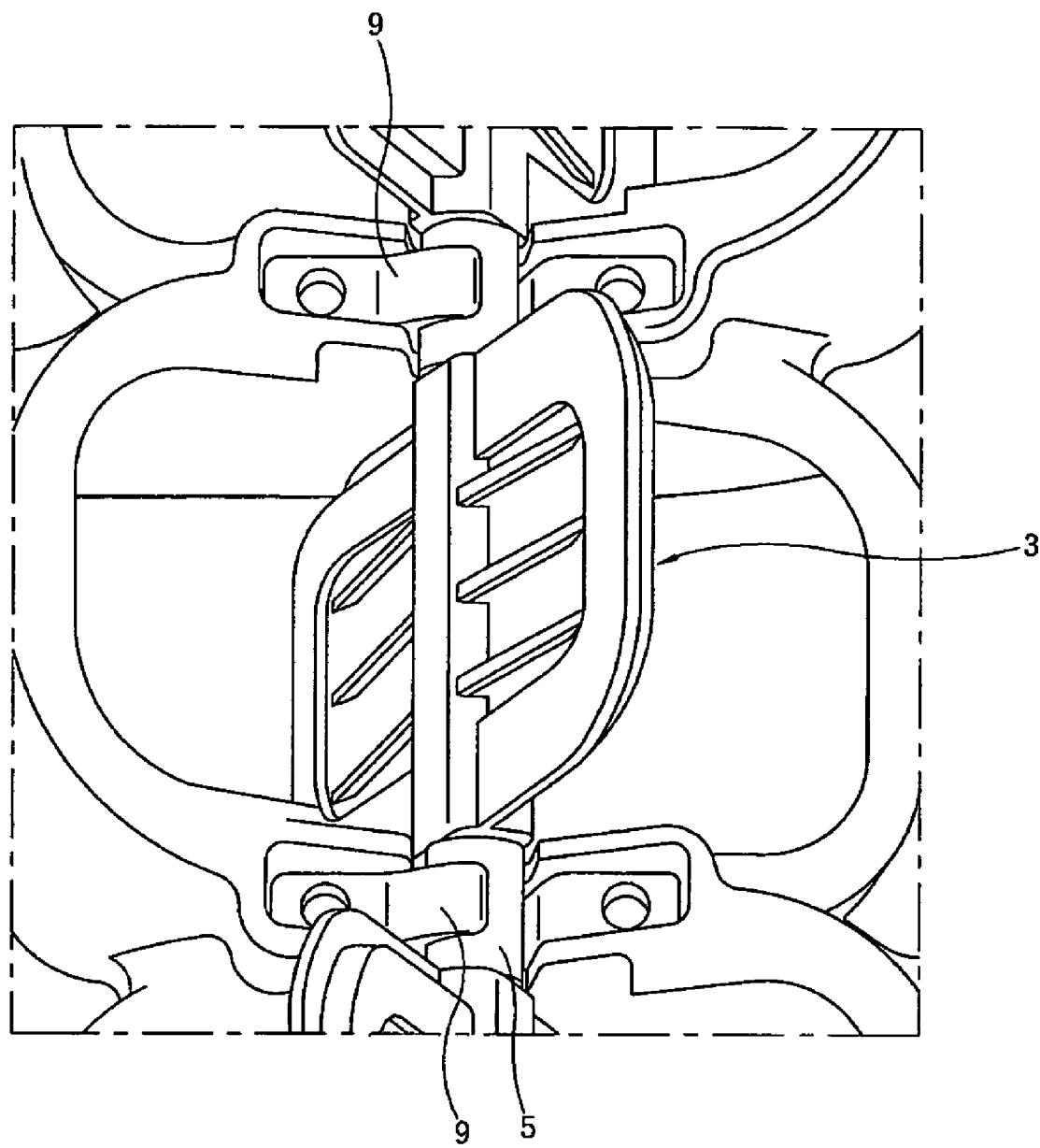
FIG. 2 is a detailed view showing an enlargement of a portion of the intake manifold assembly of FIG. 1.

The structure supporting the valve shaft 5 using retainers 9 is shown in FIG. 2 in detail.

Figure 3:
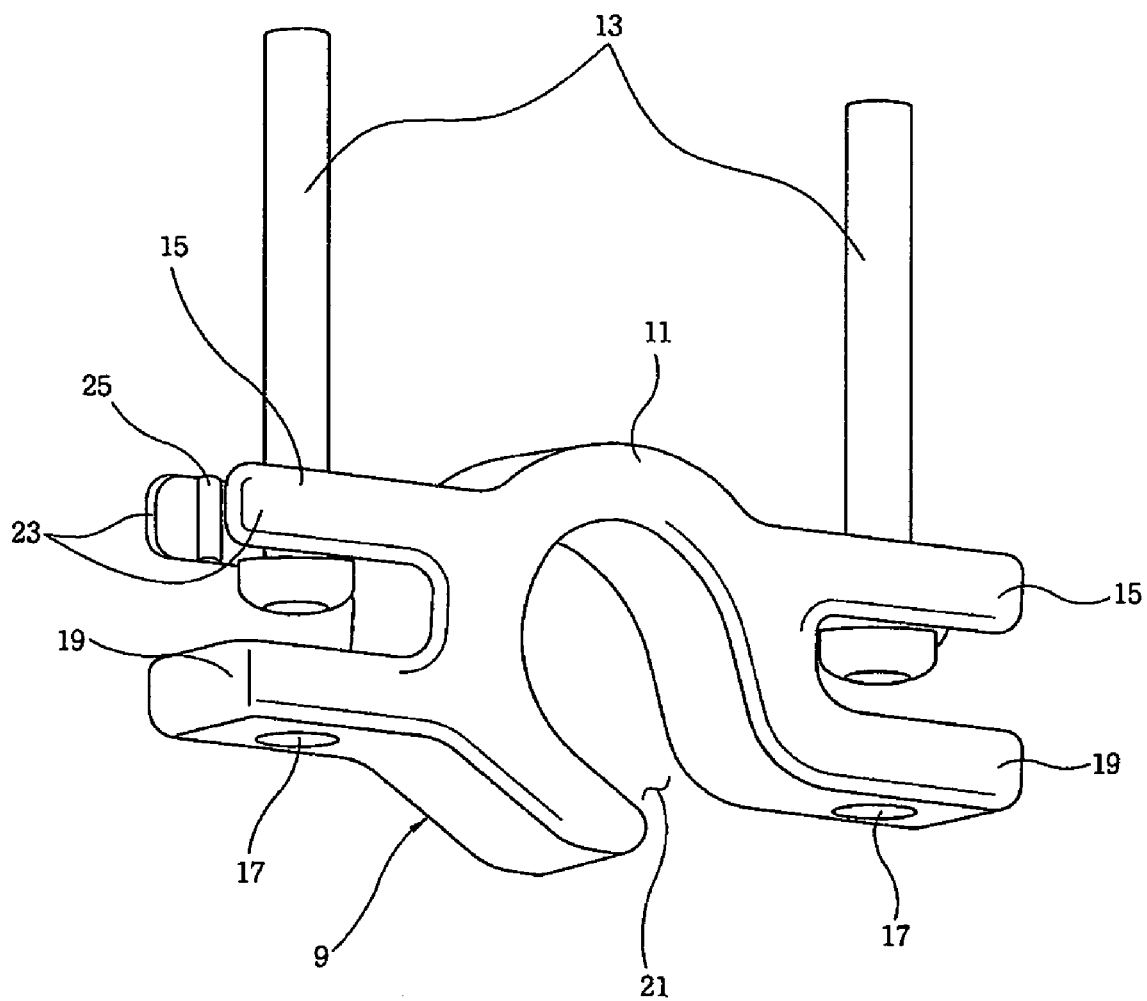

Referring to FIGS. 3 and 4, each retainer 9 according to a preferred embodiment of the present invention includes a shaft support part 1, which is provided suitably in a medial portion of a retainer body to receive and support the valve shaft 5, and a fork part 5, which is suitably provided on each end of the medial portion of the retainer body so that a shank part of a locking bolt 13 can be conveniently inserted into the fork part 5. The retainer 9 suitably further includes a stop part 19, which is provided on each end of the medial portion of the retainer body and is suitably spaced apart from each fork part 5 by a distance sufficient to place a head part of the locking bolt 13 between the fork part 15 and the stop part 19. A tool-passing hole 17 is preferably formed in each stop part 19 so that a tool for tightening or otherwise adjusting the locking bolt 13 is allowed to pass through the tool passing hole 17 of the stop part 19.

In preferred designs, the shaft support part 11 includes a shaft insertion mouth 21 oriented such that the valve shaft 5 is inserted into the shaft support part 11 in a direction opposite the screw motion of the locking bolt 13 when tightened. The size of the shaft insertion mouth 21 is suitably smaller than the diameter of the valve shaft 5, so that the valve shaft 5 can be secured in the shaft support part 11 by elastic strain of the shaft support part 11.

It thus can be preferable that the retainer 9 be made of plastic or other malleable material, allowing slight elastic deformation of the retainer 9 and providing press-fit engagement of the valve shaft.

In preferred designs, each fork part 15 includes two support arms 23 which extend outwards from the shaft support part 11. A stop protrusion 25 preferably protrudes from each support arm 23 so as to prevent the locking bolt 13 inserted between the support arms 23 from being undesirably removed from the support arms 23.

Thus, in such preferred designs, when the locking bolt 13 is coupled to the retainer 9, the shank part of the locking bolt 13 can expand space defined between the stop protrusions 25 and can be inserted into the support arms 23. After the insertion of the locking bolt 13 has been completed, the locking bolt 13 is prevented from undesirable removal from the support arms 23 by the stop protrusions 25.

Furthermore, in preferred designs, the diameter of each tool-passing hole 17 is smaller than the diameter of the head part of the locking bolt 13 and is larger than the diameter of a tool to be inserted into the tool-passing hole 17 to tighten or otherwise manipulate the locking bolt 13.

By such arrangement, where the shank part of the locking bolt 13 widens the stop protrusions 13 and is inserted into the support arms 23, the locking bolt 13 can be prevented from being undesirably removed from the support arms 23.

The retainers 9 may be assembled with the intake manifold assembly 1 suitably using the locking bolts 13, which are coupled to the retainers 9 through the above-mentioned process. Thereafter, the valve shaft 5 is fitted into the shaft support parts 11 of the retainers 9, thus completing installation of the valves 3. In the intake manifold assembly 1 to which the valves 3 are mounted, the valve shaft 5 is stably supported by the shaft support parts 11 of the retainers 9, so that stable operation of the engine can be ensured. Even if a locking bolt 13 is loosened due to vibration of the engine, the locking bolts 13 cannot be completely removed from the intake manifold assembly 1, thus avoiding undesirable entry of the locking bolt 13 into a combustion chamber.

As a consequence, systems of the invention can notably increase the reliability of an engine.

As is apparent from the foregoing, in preferred aspects, retainers of the invention are able to stably support a valve shaft of a variable intake system. Furthermore, in preferred systems of the invention, even if a locking bolt fastening the valve shaft is undesirably loosened during engine operation, the locking bolt is prevented from being completely removed from the retainer that supports the valve shaft, thus preventing potential engine damage to the engine.

While the invention has been described with reference to specific embodiments, modifications and variations may be constructed without departing from the scope of the invention, which is defined in the following claims.

What is claimed is:

1. A retainer for supporting a valve shaft of a variable intake system, comprising:
    a shaft support part provided at a medial portion of a retainer body to receive and support the valve shaft of the variable intake system;
    a fork part provided on each end of the medial portion of the retainer body, so that a shank part of a locking bolt is inserted into the fork part; and
    a stop part provided on each end of the medial portion of the retainer body and spaced apart from each fork part by a predetermined distance sufficient to place a head part of the locking bolt between the fork part and the stop part, with a tool passing hole formed in each stop part so that a tool for tightening the locking bolt is allowed to pass through the tool passing hole of the stop part.

2. The retainer of claim 1, wherein the shaft support part is provided with a shaft insertion mouth oriented such that the valve shaft is inserted into the shaft support part in a direction opposite to screw motion of the locking bolt when being tightened, and a size of the shaft insertion mouth is smaller than a diameter of the valve shaft, so that the valve shaft is fitted into the shaft support part using elastic strain of the shaft support part.

3. The retainer of claim 2. wherein each fork part comprises:
    two support arms extending outwards from the shaft support part; and
    stop protrusions protruding from the support arms to prevent the locking bolt inserted between the support arms from being removed from the support arms.

4. A vehicular variable intake system comprising the retainer of claim 1.

5. The system of claim 4 wherein a valve shaft engages the retainer.

6. A retainer for engaging a valve shaft of a variable intake system, comprising:
    a shaft support part that can engage a valve shaft of the variable intake system;
    a fork part that can engage a valve shaft locking bolt; and
    a stop part spaced from the fork part by a distance sufficient to position the locking bolt between the fork part and the stop part,
    wherein an aperture is in the stop part whereby a tool can be advanced therethrough to manipulate locking bolt.

7. The retainer of claim 6 wherein the shaft support part is provided with a shaft insertion mouth oriented such that the valve shaft can be inserted into the shaft support part in a direction opposite to screw motion of the locking bolt when being tightened.

8. The retainer of claim 7 wherein a valve shaft can be press fit into the shaft insertion mouth.

9. The retainer of claim 7 wherein the shaft insertion mouth is smaller than a diameter of the valve shaft whereby the valve shaft can be fitted into the shaft support part using elastic strain of the shaft support part.

10. The retainer of 6 wherein the fork part comprises one or more support arms extending outwards from the shaft support part.

11. The retainer of claim 10 wherein the fork part further comprises one or more stop protrusions protruding from the support arms to inhibit withdrawal of the locking bolt inserted between the support arms.

12. A vehicular variable intake system comprising the retainer of claim 6.

13. The system of claim 12 wherein a valve shaft engages the retainer.

* * * * *